(12) United States Patent
Murthy et al.

(10) Patent No.: US 12,417,352 B1
(45) Date of Patent: Sep. 16, 2025

(54) SYSTEMS AND METHODS FOR USING A LARGE LANGUAGE MODEL FOR LARGE DOCUMENTS

(71) Applicant: Instabase, Inc., Dover, DE (US)

(72) Inventors: Vineeth Chinmaya Murthy, Bengaluru (IN); Rafal Powalski, Warsaw (PL); Atinderpal Singh, Bathinda (IN); Sławomir Jan Biel, Warsaw (PL); Hariharan Thirugnanam, Bangalore (IN); Bartosz Topolski, Warsaw (IN)

(73) Assignee: Instabase, Inc., Dover, DE (US)

( * ) Notice: Subject to any disclaimer, the term of this patent is extended or adjusted under 35 U.S.C. 154(b) by 250 days.

(21) Appl. No.: 18/327,676

(22) Filed: Jun. 1, 2023

(51) Int. Cl.
*G06F 40/30* (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS

| | | |
|---|---|---|
| 5,848,184 A | 12/1998 | Taylor |
| 5,898,795 A | 4/1999 | Bessho |
| 7,689,431 B1 | 3/2010 | Carmel |
| 7,720,318 B1 | 5/2010 | Phinney |
| 7,725,423 B1 | 5/2010 | Pricer |
| 8,254,681 B1 | 8/2012 | Poncin |
| 9,275,030 B1 | 3/2016 | Fang |
| 9,607,058 B1 | 3/2017 | Gupta |
| 10,642,832 B1 | 5/2020 | Neumann |
| 10,679,089 B2 | 6/2020 | Annis |
| 11,315,353 B1 | 4/2022 | Cahn |
| 11,947,604 B2 | 4/2024 | Roitman |
| 11,995,394 B1 | 5/2024 | Morariu |

(Continued)

FOREIGN PATENT DOCUMENTS

| | | |
|---|---|---|
| CN | 117951274 A | 4/2024 |
| CN | 118332072 A | 7/2024 |

(Continued)

OTHER PUBLICATIONS

Chaudhuri et al., "Extraction of type style-based meta-information from imaged documents", IJDAR (2001) 3: 138-149. (Year: 2001).

(Continued)

*Primary Examiner* — Quynh H Nguyen
(74) *Attorney, Agent, or Firm* — Esplin & Associates, PC

(57) ABSTRACT

Systems and methods for using a machine learning model for a set of one or more documents are disclosed. Exemplary implementations may: create a set of document segments from the set of one or more documents; create a set of semantic vectors; create a query vector that semantically represents a query from a user; determine a subset of the set of semantic vectors based on at least two different comparisons involving the query vector; create a combination of the individual document segments that are associated with the subset of the set of semantic vectors; provide a prompt to the machine learning model, using the created combination of the individual document segments as context; present replies from the machine learning model, and/or perform other steps.

16 Claims, 4 Drawing Sheets

(56) References Cited

U.S. PATENT DOCUMENTS

| | | |
|---|---|---|
| 12,182,125 B1 | 12/2024 | Buniatyan |
| 2002/0064316 A1 | 5/2002 | Takaoka |
| 2004/0181749 A1 | 9/2004 | Chellapilla |
| 2004/0223648 A1 | 11/2004 | Hoene |
| 2005/0289182 A1 | 12/2005 | Pandian |
| 2008/0148144 A1 | 6/2008 | Tatsumi |
| 2008/0212901 A1 | 9/2008 | Castiglia |
| 2008/0291486 A1 | 11/2008 | Isles |
| 2009/0076935 A1 | 3/2009 | Knowles |
| 2009/0132590 A1 | 5/2009 | Huang |
| 2012/0072859 A1 | 3/2012 | Wang |
| 2012/0204103 A1 | 8/2012 | Stevens |
| 2014/0200880 A1 | 7/2014 | Neustel |
| 2014/0214732 A1 | 7/2014 | Carmeli |
| 2015/0012422 A1 | 1/2015 | Ceribelli |
| 2015/0169951 A1 | 6/2015 | Khintsitskiy |
| 2015/0169995 A1 | 6/2015 | Panferov |
| 2015/0278197 A1 | 10/2015 | Bogdanova |
| 2016/0014299 A1 | 1/2016 | Saka |
| 2016/0275526 A1 | 9/2016 | Becanovic |
| 2018/0189592 A1 | 7/2018 | Annis |
| 2018/0329890 A1 | 11/2018 | Ito |
| 2019/0138660 A1 | 5/2019 | White |
| 2019/0171634 A1 | 6/2019 | Nowakiewicz |
| 2019/0286900 A1 | 9/2019 | Pepe, Jr. |
| 2019/0340949 A1* | 11/2019 | Meisner ............. G09B 5/04 |
| 2020/0004749 A1 | 1/2020 | Slezak |
| 2020/0089946 A1 | 3/2020 | Mallick |
| 2020/0104359 A1 | 4/2020 | Patel |
| 2020/0159848 A1 | 5/2020 | Yeo |
| 2020/0311349 A1 | 10/2020 | Balasubramanian |
| 2020/0320072 A1 | 10/2020 | Hormati |
| 2020/0364343 A1 | 11/2020 | Atighetchi |
| 2020/0379673 A1 | 12/2020 | Le Gallo-Bourdeau |
| 2021/0034621 A1 | 2/2021 | Patel |
| 2021/0258448 A1 | 8/2021 | Inoue |
| 2022/0164346 A1 | 5/2022 | Mitra |
| 2022/0398858 A1 | 12/2022 | Cahn |
| 2022/0414075 A1 | 12/2022 | Li |
| 2022/0414430 A1 | 12/2022 | Li |
| 2022/0414492 A1 | 12/2022 | Jezewski |
| 2023/0044564 A1 | 2/2023 | Jezewski |
| 2023/0315731 A1 | 10/2023 | Xu |
| 2023/0334889 A1 | 10/2023 | Cahn |
| 2023/0385261 A1 | 11/2023 | Siddiqui |
| 2024/0096125 A1 | 3/2024 | Yebes Torres |
| 2024/0202539 A1 | 6/2024 | Poirier |
| 2024/0221007 A1 | 7/2024 | Hormati |
| 2024/0311407 A1 | 9/2024 | Barron |
| 2024/0338361 A1 | 10/2024 | Hazel |
| 2025/0045314 A1 | 2/2025 | Madnani |
| 2025/0077527 A1 | 3/2025 | Vaughn |
| 2025/0086190 A1 | 3/2025 | Azarmi |

FOREIGN PATENT DOCUMENTS

| | | |
|---|---|---|
| CN | 118656482 A | 9/2024 |
| CN | 118939782 A | 11/2024 |

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Documents Based on OCR", 2019 XXI International Conference Complex Systems: Control and Modeling Problems (CSCMP), pp. 177-181, published on Sep. 1, 2019. (Year: 2019).

* cited by examiner

Lorem ipsum dolor sit amet, consectetur adipiscing elit. Sed eget risus porttitor, luctus urna quis, aliquam odio. Nullam ipsum sem, venenatis ut felis vitae, hendrerit mattis libero. Fusce elit sem, tincidunt id convallis ac, posuere efficitur neque. Fusce scelerisque, quam vel placerat feugiat, eros est varius odio, non finibus velit ipsum a urna. ← 31

Donec vel lectus quis elit porttitor dictum vitae eu est. Donec auctor lectus sed consectetur congue. Sed est quam, convallis bibendum cursus in, egestas eget risus. Aliquam tincidunt arcu id risus fringilla, sed posuere est blandit. Donec quis sagittis mauris, non vulputate velit. Phasellus cursus blandit magna, sit amet eleifend velit mollis quis. ← 32

Nullam sit amet sem placerat, placerat augue a, ultrices nisi. Ut non orci ac risus gravida sodales. Fusce placerat, lorem vitae cursus finibus, magna risus bibendum nulla, at faucibus purus dui sit amet justo. Vivamus sed porttitor risus. Donec sed interdum lacus. Nunc quis finibus purus. Suspendisse potenti. Integer molestie urna eu justo ullamcorper, id molestie mauris convallis. ← 33

Mauris venenatis turpis lobortis ipsum interdum imperdiet. Suspendisse sollicitudin orci sed nulla placerat feugiat. Aliquam luctus, est quis suscipit scelerisque, justo libero efficitur elit, et tempor ipsum arcu vel ex. Cras erat est, ornare eget tempor non, semper sed nunc. Donec cursus vestibulum tellus, nec feugiat odio fermentum eget. Donec sodales id dolor a tristique. Suspendisse vel posuere est, at efficitur ipsum. ← 34

*Fig. 3A*

SYSTEMS AND METHODS FOR USING A LARGE LANGUAGE MODEL FOR LARGE DOCUMENTS

FIELD OF THE DISCLOSURE

The present disclosure relates to systems and methods for using a machine learning model for extracting information from a set of one or more documents.

BACKGROUND

Extracting information from electronic documents is known. Presenting information in user interfaces is known. Large language models are known.

SUMMARY

One aspect of the present disclosure relates to a system configured for using a machine learning model for a set of one or more documents. In some implementations, the set of one or more documents spans at least 200 pages. The system may include one or more hardware processors configured by machine-readable instructions. The system may be configured to create a set of document segments from the set of one or more documents. The system may be configured to create a set of semantic vectors. The system may be configured to create a query vector that semantically represents a query from a user. The system may be configured to determine a subset of the set of semantic vectors based on at least two different comparisons involving the query vector. The system may be configured to create a combination of the individual document segments that are associated with the subset of the set of semantic vectors. The system may be configured to provide a prompt to the machine learning model, using the created combination of the individual document segments as context. The system may be configured to present replies from the machine learning model. The system may be configured to perform other steps.

Another aspect of the present disclosure relates to a method of using a machine learning model for a set of one or more documents. In some implementations, the set of one or more documents spans at least 200 pages. The method may include creating a set of document segments from the set of one or more documents. The method may include creating a set of semantic vectors. The method may include creating a query vector that semantically represents a query from a user. The method may include determining a subset of the set of semantic vectors based on at least two different comparisons involving the query vector. The method may include creating a combination of the individual document segments that are associated with the subset of the set of semantic vectors. The method may include providing a prompt to the machine learning model, using the created combination of the individual document segments as context. The method may include presenting replies from the machine learning model. The method may include performing other steps.

As used herein, any association (or relation, or reflection, or indication, or correspondency) involving servers, processors, client computing platforms, documents, formats, blocks of content, characters, vectors, conversations, presentations, extracted information, user interfaces, user interface elements, fields, portions, queries, replies, prompts, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A illustrates an exemplary electronic document as may be used in a system configured for using a machine learning model for a set of one or more documents, in accordance with one or more implementations.

DETAILED DESCRIPTION

Figure 1:
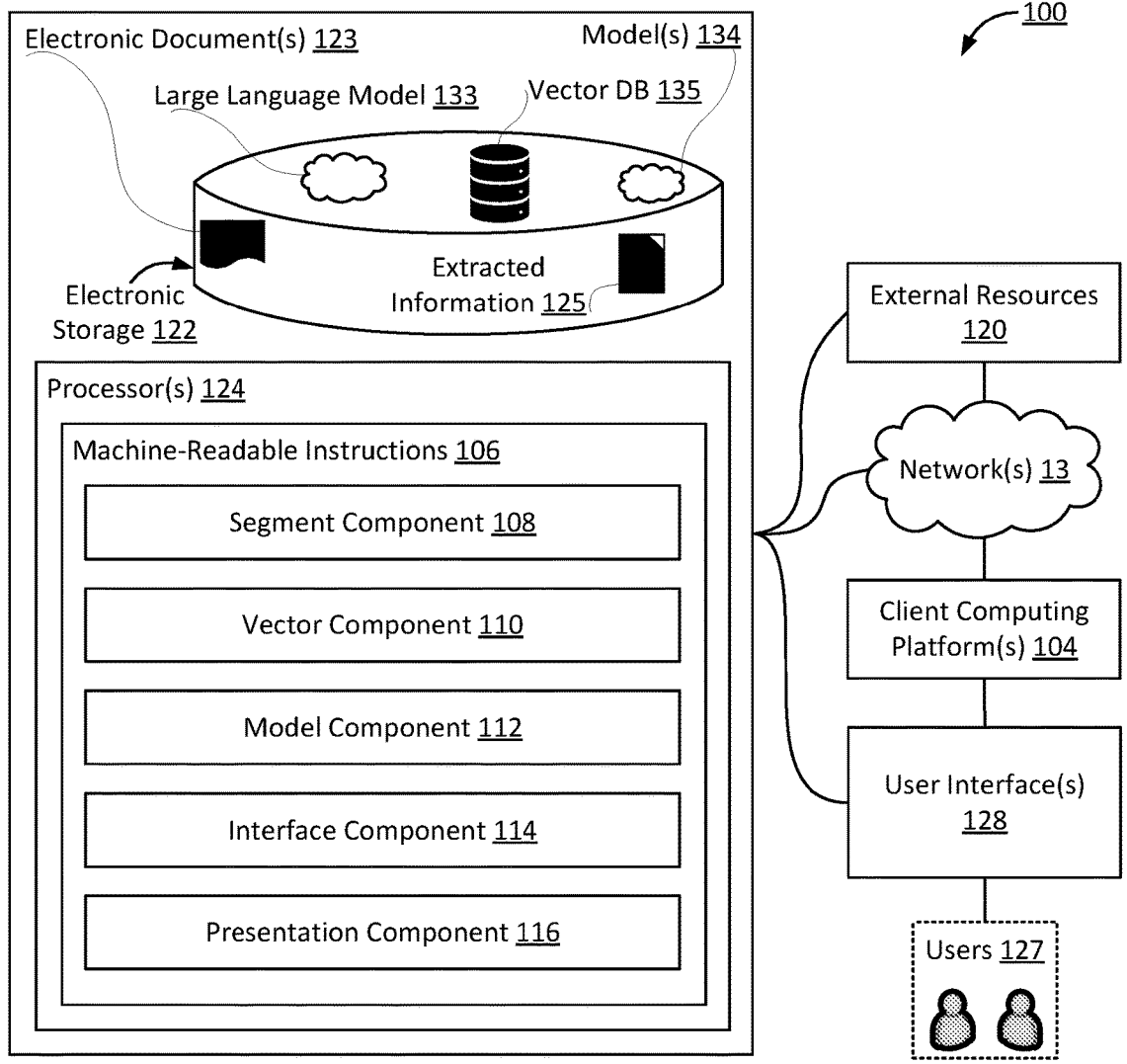
FIG. 1 illustrates a system configured for using a machine learning model for a set of one or more documents, in accordance with one or more implementations.

FIG. 1 illustrates a system 100 configured for using one or more models 134 (which may include one or more machine learning models) for a set of one or more (electronic) documents 123, in accordance with one or more implementations. In some implementations, system 100 may include one or more servers 102, one or more client computing platforms 104, one or more user interfaces 128, external resources 120, a large language model 133, one or more other models 134, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

By virtue of the systems and methods disclosed herein, a user may use one or more models 134 (e.g., a machine learning model such as large language model 133) to extract information from a set of electronic documents, even though the set of electronic documents is sufficiently large (e.g., spanning at least 200 pages) that using the entirety of the set as context exceeds the capacity (e.g., in pages, vectors, tokens, and/or another measure of information quantity) of one or more models 134 to be used as context. Instead, a subset or portion of the set of documents is used as context. How the extracted information is subsequently used may be outside of the scope of this disclosure. By way of non-limiting example, the systems and methods disclosed herein may be used to process a mortgage application, a loan application, an insurance claim, an application for an identity document, and/or other uses of (automatically) extracting information from documents.

Server(s) 102 may be configured by machine-readable instructions 106. Machine-readable instructions 106 may include one or more instruction components. The instruction components may include computer program components. The instruction components may include one or more of a segment component 108, a vector component 110, a model component 112, an interface component 114, a presentation component 116, and/or other instruction components.

Segment component 108 may be configured to obtain and/or retrieve documents, including but not limited to electronic documents 123, including scanned images, captured photographs, and/or other documents in electronic format. As used herein, the terms "electronic document" and "electronic source document", and derivatives thereof, may be used interchangeably. In some implementations, multiple documents may form a set of documents. For example, the set of documents may be provided as input and/or context for extracting information.

Segment component 108 may be configured to create and/or otherwise determine document segments from a page, a document, and/or a set of documents. As used herein, document segments may be referred to as document chunks. For example, a document segment may be a portion or segment of a page, a document, and/or a set of documents. For example, a particular document segment may be one or more paragraphs or sentences of a document. In some cases, a particular document segment may be a caption, a title, a header, and/or a footer of a document. In some cases, a particular document segment may be a partial or entire column, row, list, table, and/or other structured information element contained within a document. Segment component 108 may create a set of document segments from a set of one or more documents. In some cases, the set of one or more documents may span at least 200 pages, at least 300 pages, at least 400 pages, at least 500 pages, and/or another minimum number of pages (or, in some cases, a minimum quantity of information). In some cases, the quantity of information in a set of one or more documents may be defined and/or determined not (merely) by page count, but rather by a number of segments, a number of tokens, a number of semantic vectors, and/or combinations thereof. In some implementations, the creation of document segments may be based on the type of contents on one or more pages (e.g., prose, natural language, structured information, tables, etc, etc.).

In some implementations, segment component 108 may be configured to create combinations of individual document segments. For example, a particular combination may be used as context for one or more models 134 (e.g., a machine learning model such as large language model 133). In particular, the particular combination may be used as context for a prompt provided to large language model 133, the prompt being a query. In some implementations, a combination of individual document segments may include those document segments that are associated with a particular subset of semantic vectors, in particular, a subset of semantic vectors that has been determined and/or selected by vector component 110 and/or another component of system 100.

In some implementations, segment component 108 may obtain and/or access documents forming a corpus of electronic documents, and/or a set of electronic documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for the electronic documents may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic document 123 may represent one or more of a bank statement, a financial record, a photocopy of a physical document from a government agency, and/or other documents. For example, a particular electronic document 123 may include a captured and/or generated image and/or video. For example, a particular electronic document 123 may be a captured and/or generated image. The electronic documents obtained by segment component 108 may have a particular size and/or resolution.

Referring to FIG. 1, presentation component 116 may be configured to generate, effectuate, and/or present user interfaces 128 on client computing platforms 104 to users 127. For example, presentation component 116 may be configured to present a particular user interface 128 on a particular client computing platform 104 to a particular user. In some implementations, particular user interface 128 may be configured to obtain (entry of) user input from a particular user. For example, the user input may be a particular query from the particular user (e.g., to be provided to one or more models 134, such as large language model 133). In some implementations, the user input may select one or more documents, including but not limited to a set of exemplary document. In some cases, the user input may indicate a folder of training data. In some implementations, the one or more documents may be provided as input to extract information, e.g., from a particular corpus of electronic documents. In some implementations, the user input may navigate between a set of different portions or sections of particular user interface 128. For example, particular user interface 128 may include one or more portions or sections. In some implementations, a portion or section may be a (sub) window, a tab, a frame, and/or another part of particular user interface 128.

Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of particular user interface 128.

User interfaces 128 may be configured to enable users 127 to control (e.g., through user input) the extraction of information from one or more documents. Extraction of information may be performed by large language model 133 (e.g., using a particular document as input and/or context). In some implementations, the extraction of information may be user-directed, i.e., controlled by an individual one of users 127 through user input into, e.g., fourth portion 44 of particular user interface 128.

Referring to FIG. 1, model component 112 may be configured to obtain, access, use, and/or fine-tune one or more models 134, e.g., such as large language model 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3).

In some implementations, model component 112 may be configured to create vectors, arrays, and/or other mathematical representations of information, including but not limited to user input, queries, document segments, words, tokens, and/or other types of information. For example, model component 112 may create one or more semantic vectors that are associated with one or more document segments. Semantic vectors may represent semantic information. As used herein, vectors may represent what text means by a set of numbers, sometimes referred to as text embeddings. Such vectors may have hundreds or thousands of dimensions, and the values for these dimensions may be stored and/or organized in an array of floating point numbers. For example, model component 112 may create a query vector that semantically represents a particular query. In some implementations, model component 112 may use one or more models 134, such as large language model 133, to determine and/or create semantic vectors.

In some implementations, model component 112 may be configured to fine-tune large language model 133 through a set of documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table. Accordingly, information elements in a column, or a row, or a table may be contextually and/or semantically linked and/or otherwise connected such that large language model 133 may extract information from a particular document based on knowledge of the formatted information in the particular document. In some implementations, model component 112 may be configured to obtain and/or present replies provided by large language model 133 to queries and/or prompts.

Referring to FIG. 1, interface component 114 may be configured to provide documents to large language model 133 as input and/or context. For example, interface component 114 may provide one or more particular documents to large language model 133 as input and/or context for queries and/or other types of extraction of information. In some implementations, interface component 114 may be configured to provide sets or subsets of document segments to large language model 133 as input and/or context, such as, for example, a particular combination of individual document segments as created by segment component 108. In some implementations, interface component 114 provides input documents to large language model 133 for extraction of information, including but not limited to user-directed extraction of information. In some implementations, interface component 114 may be configured to provide queries as prompts to large language model 133. In some implementations, interface component 114 may be configured to obtain replies to queries from large language model 133. In some implementations, interface component 114 may provide input and/or prompts to large language model 133 after or subsequent to fine-tuning of large language model 133 by model component 112.

Referring to FIG. 1, vector component 110 may be configured to determine and/or select a subset of a set of semantic vectors, such as, by way of non-limiting example, the particular set of semantic vectors that has been determined and/or created by model component 112 and/or machine learning model 134 and/or large language model 133. In some implementations, determinations by vector component 110 may be based on a first type of comparisons, a second type of comparisons, and/or other types of comparisons. For example, a first type of comparisons may compare a semantic vector (e.g., a particular query vector) with other semantic vectors (e.g., as stored in vector database 135). In some implementations, such a comparison may be based on one or both of semantic distance and/or (cosine) similarity. For example, different words having similar meanings may have a smaller semantic distance (or more similarity) than unrelated words. For example, "fruit" and "juice" may have a smaller semantic distance than "bicycle" and "goldfish". As another example, a second type of comparisons may use keyword matching and/or keyword searching, in which two words need to match verbatim and/or to the letter. By way of non-limiting example, measuring similarity between vectors may include calculating inner product, cosine similarity, Euclidean distance, Jaccard similarity, Manhattan similarity, and/or another similarity metric.

In some implementations, another type of comparison used for determinations by vector component 110 may be based on absolute positioning of a corresponding document segment within a particular set of documents. For example, the first page of a particular set of documents may be an important absolute position for determinations by vector component 110. Likewise, in some cases, the last page of a particular set of documents may be an important absolute position for determinations by vector component 110.

In some implementations, another type of comparison used for determinations by vector component 110 may be based on relative positioning of a corresponding document segment within a particular set of documents. For example, a document segment adjacent to another document segment that was previously selected (e.g., based on the first or second type of comparisons) may be an important document segment for determinations by vector component 110.

Vector component 110 may be configured to store vectors and/or other information in vector database 135 and/or other storage, including but not limited to electronic storage 122. For example, vector component 110 may store semantic vectors (e.g., as determined by model component 112 and/or machine learning model 134 and/or large language model 133) in vector database 135.

By way of non-limiting example, FIG. 3A illustrates an exemplary page 30 of an exemplary document as may be used in system 100 (of FIG. 1), in accordance with one or more implementations. As depicted, exemplary page 30 includes a first paragraph 31, a second paragraph 32, a third paragraph 33, and a fourth paragraph 34. In some cases, individual paragraphs may be individual document segments (e.g., as created by segment component 108). Alternatively, and/or simultaneously, individual sentences within a paragraph may be individual document segments (e.g., as created by segment component 108). For example, first paragraph 31 includes five sentences. Exemplary page 30 may contain prose, narrative, and/or other natural language. In some cases, contents similar in type to exemplary document 30 may be suitable for natural language searching. A suitable type of comparison for similar content may be the first type of comparison as performed by vector component 110. For example, if a query is about "danger", or "deadly", or "poison", the word "venenatis" (from the Latin word for poisonous) in first paragraph 31 would be relevant. Likewise, document segments that include this word (such as, by way of non-limiting example, the third sentence of first paragraph 31) may be relevant. In some cases, adjacent paragraphs or document segments (such as, by way of non-limiting example, second paragraph 32) may be relevant. Vector component 110 may select the semantic vectors for these relevant document segments as part of a particular subset of vectors (from the available vectors in vector database 135). As another example in FIG. 3A, vector component 110 may perform the second type of comparison, for a keyword search, for (part of) exemplary page 30. For example, if a query pertains to the term "suspendisse", fourth paragraph 34 contains two instances of exactly that word, in its second sentence and its last sentence. For keyword searching, fewer and/or different document segments may be relevant. Vector component 110 may select the semantic vectors for such relevant document segments as part of a particular subset of vectors (from the available vectors in vector database 135).

Figure 3B:
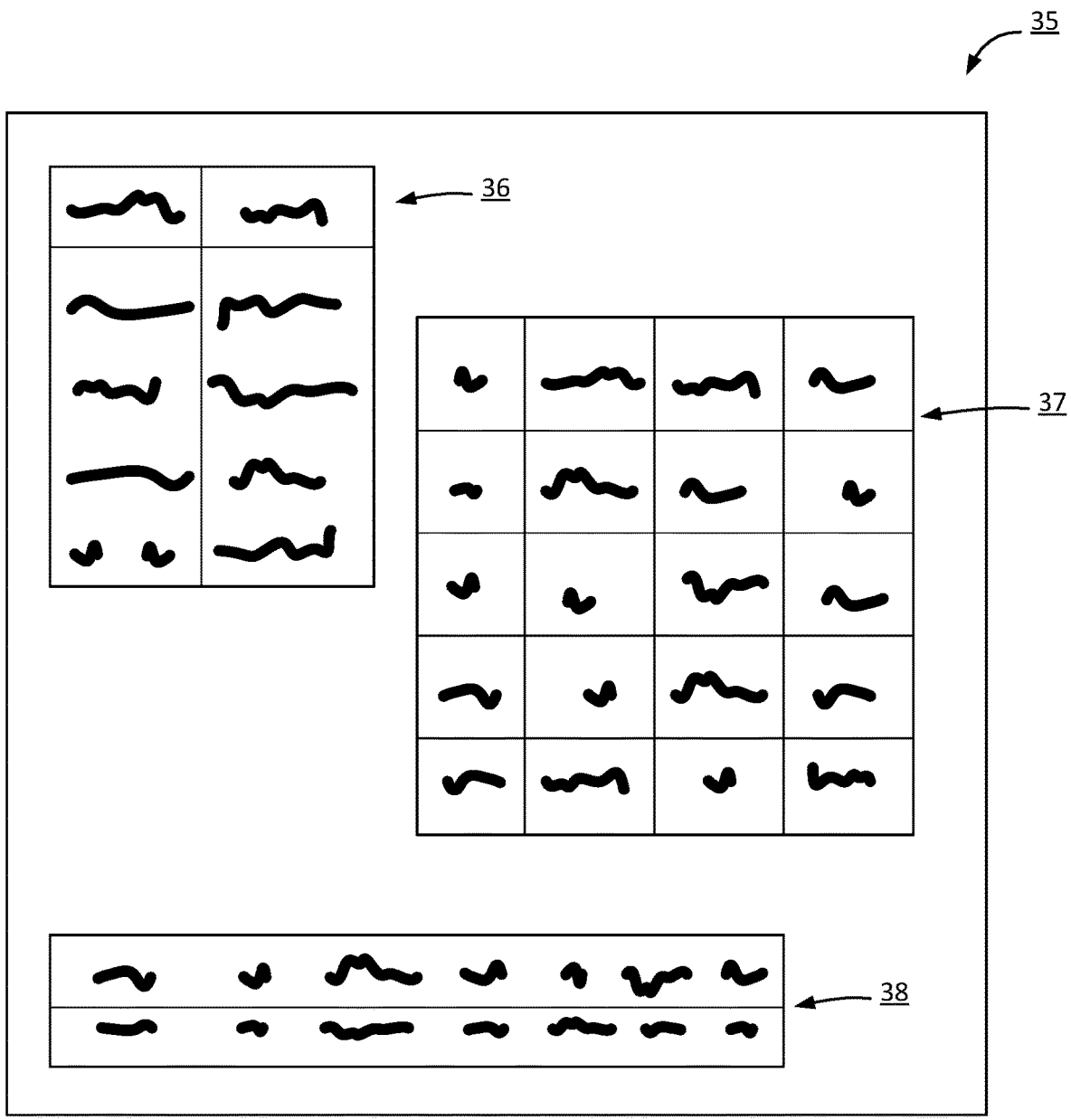
FIG. 3B illustrates an exemplary document as may be used in a system configured for using a machine learning model for a set of one or more documents, in accordance with one or more implementations.

By way of non-limiting example, FIG. 3B illustrates an exemplary page 35 of a sample document as may be used in system 100 (of FIG. 1), in accordance with one or more implementations. As depicted, exemplary page 35 includes a first table 36, a second table 37, and a third table 38 (the information in these tables may be any type of human-readable information). In some cases, individual tables may be individual document segments (e.g., as created by segment component 108, since information within a table or row or column may be more relevant to other information within the same table, even though other information on the same page may be literally closer when the page is presented to a reader). Alternatively, and/or simultaneously, individual cells, rows, and/or columns within a table may be individual document segments (e.g., as created by segment component 108, and having corresponding individual semantic vectors). For example, first table 36 includes two columns. Exemplary page 35 may contain structured information. In some cases, contents similar in type to exemplary page 35 may be suitable for keyword searching. Here, a suitable type of comparison for similar content may be the second type of comparison as performed by vector component 110.

Referring to FIG. 1, as used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an Optical Character Recognition engine or OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic documents 123, from which system 100 and/or its components (e.g., segment component 108) may obtain documents. In some implementations, external resources 120 may include a provider of information and/or models, including but not limited to extracted information 125, model(s) 134, and/or other information from which system 100 and/or its components may obtain information and/or input. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 2:
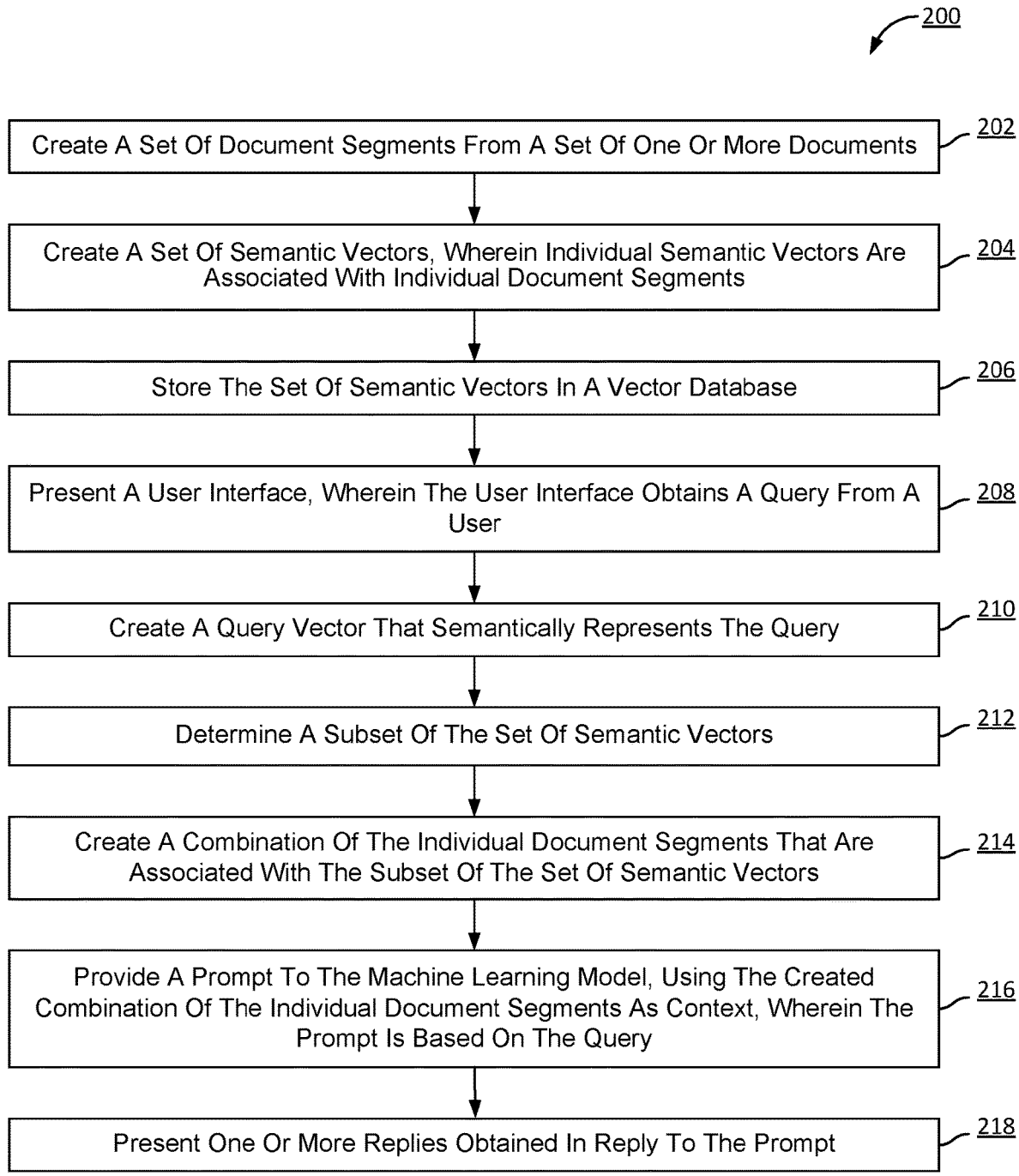
FIG. 2 illustrates a method of using a machine learning model for a set of one or more documents, in accordance with one or more implementations.

FIG. 2 illustrates a method 200 of using a machine learning model for a set of one or more documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, a set of document segments is created from the set of one or more documents. In some embodiments, operation 202 is performed by a segment component the same as or similar to segment component 108 (shown in FIG. 1 and described herein).

At an operation 204, a set of semantic vectors is created, using the machine learning model. Individual semantic vectors are associated with individual document segments. In some embodiments, operation 204 is performed by a model component and/or machine learning model the same as or similar to model component 112 and/or machine learning model 134 and/or large language model 133 (shown in FIG. 1 and described herein).

At an operation 206, the set of semantic vectors is stored in a vector database. In some embodiments, operation 206 is performed by a vector component the same as or similar to vector component 110 (shown in FIG. 1 and described herein).

At an operation 208, a presentation of a user interface is effectuated. The user interface obtains a query from a user. In some embodiments, operation 208 is performed by a presentation component the same as or similar to presentation component 116 (shown in FIG. 1 and described herein).

At an operation 210, a query vector is created that semantically represents the query, using the machine learning model. In some embodiments, operation 210 is performed by a model component and/or machine learning model the same as or similar to model component 112 and/or machine learning model 134 and/or large language model 133 (shown in FIG. 1 and described herein).

At an operation 212, a subset of the set of semantic vectors is determined. The determination is based on (i) a first type of comparison with the query vector, and (ii) a second type of comparison with the query vector. In some embodiments, operation 212 is performed by a vector component the same as or similar to vector component 110 (shown in FIG. 1 and described herein).

At an operation 214, a combination of the individual document segments is created that are associated with the subset of the set of semantic vectors. In some embodiments, operation 214 is performed by a segment component the same as or similar to segment component 108 (shown in FIG. 1 and described herein).

At an operation 216, a prompt is provided to the machine learning model, using the created combination of the individual document segments as context. The prompt is based on the query. In some embodiments, operation 216 is performed by an interface component the same as or similar to interface component 114 (shown in FIG. 1 and described herein).

At an operation 218, one or more replies are presented to the user, through the user interface. The one or more replies are obtained from the machine learning model in reply to the prompt. In some embodiments, operation 218 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for using a machine learning model to extract information from a set of one or more documents, wherein the set of one or more documents spans at least 200 pages, the system comprising:
    one or more hardware processors configured by machine-readable instructions to:
        create a set of document segments from the set of one or more documents;
        create, using the machine learning model, a set of semantic vectors, wherein individual semantic vectors are associated with individual document segments;
        store the set of semantic vectors in a vector database;
        effectuate a presentation of a user interface, the user interface being configured to obtain a query from a user, wherein the query pertains to extracting particular information from the set of one or more documents;
        create, using the machine learning model, a query vector that semantically represents the query;
        determine a subset of the set of semantic vectors, wherein the determination is based on both:
            (i) a first type of comparison of the set of semantic vectors with the query vector, and
            (ii) a second type of comparison of the set of semantic vectors with the query vector, and wherein the determination of the subset of the set of semantic vectors is further based on relative positions of the individual document segments in proximity to other individual document segments based on at least one of (i) and/or (ii);
        create a combination of the individual document segments that are associated with the subset of the set of semantic vectors such that a quantity of information represented by the subset of the set of semantic vectors is within a capacity of the machine learning model to use as context;
        provide a prompt to the machine learning model, using the created combination of the individual document segments as context, wherein the prompt is based on the query; and
        present to the user, through the user interface, one or more replies obtained from the machine learning model in reply to the prompt, wherein the one or more replies are related to the particular information as extracted from the set of one or more documents.

2. The system of claim 1, wherein the first type of comparison compares similarity between an individual semantic vector with the query vector, wherein the similarity represents natural language searching.

3. The system of claim 1, wherein the second type of comparison compares an individual semantic vector with the query vector in a manner that represents keyword searching.

4. The system of claim 1, wherein the determination of the subset of the set of semantic vectors is further based on: (iii) absolute positions of individual document segments within the set of one or more documents.

5. The system of claim 1, wherein the machine learning model is limited to a predetermined number of tokens as the context for the prompt, and wherein the combination of the individual document segments is created such that the predetermined number of tokens is not exceeded.

6. The system of claim 1, wherein the machine learning model is a large language model.

7. The system of claim 6, wherein the large language model has been trained on at least a million documents, wherein the large language model includes a neural network using over a billion parameters and/or weights.

8. The system of claim 7, wherein the large language model is based on or derived from Generative Pre-trained Transformer 3 (GPT3) or a successor of Generative Pre-trained Transformer 3 (GPT3).

9. A computer-implemented method using one or more hardware processors to extract information from a set of one or more documents through a machine learning model, wherein the set of one or more documents spans at least 200 pages, the method comprising:
    creating a set of document segments from the set of one or more documents;
    creating, using the machine learning model, a set of semantic vectors, wherein individual semantic vectors are associated with individual document segments;
    storing the set of semantic vectors in a vector database;
    effectuating a presentation of a user interface, wherein the user interface obtains a query from a user, wherein the query pertains to extracting particular information from the set of one or more documents;
    creating, using the machine learning model, a query vector that semantically represents the query;
    determining a subset of the set of semantic vectors, wherein the determination is based on both (i) a first type of comparison of the set of semantic vectors with the query vector, and (ii) a second type of comparison of the set of semantic vectors with the query vector, and wherein the determination of the subset of the set of semantic vectors is further based on relative positions of the individual document segments in proximity to other individual document segments based on at least one of (i) and/or (ii);
    creating a combination of the individual document segments that are associated with the subset of the set of semantic vectors such that a quantity of information represented by the subset of the set of semantic vectors is within a capacity of the machine learning model to use as context;
    providing a prompt to the machine learning model, using the created combination of the individual document segments as context, wherein the prompt is based on the query; and
    presenting to the user, through the user interface, one or more replies obtained from the machine learning model in reply to the prompt, wherein the one or more replies are related to the particular information as extracted from the set of one or more documents.

10. The computer-implemented method of claim 9, wherein the first type of comparison compares similarity between an individual semantic vector with the query vector, wherein the similarity represents natural language searching.

11. The computer-implemented method of claim 9, wherein the second type of comparison compares an individual semantic vector with the query vector in a manner that represents keyword searching.

12. The computer-implemented method of claim 9, wherein the determination of the subset of the set of semantic vectors is further based on: (iii) absolute positions of individual document segments within the set of one or more documents.

13. The computer-implemented method of claim 9, wherein the machine learning model is limited to a predetermined number of tokens as the context for the prompt, and wherein the combination of the individual document segments is created such that the predetermined number of tokens is not exceeded.

14. The computer-implemented method of claim 9, wherein the machine learning model is a large language model.

15. The computer-implemented method of claim 14, wherein the large language model has been trained on at least a million documents, wherein the large language model includes a neural network using over a billion parameters and/or weights.

16. The computer-implemented method of claim 15, wherein the large language model is based on or derived from Generative Pre-trained Transformer 3 (GPT3) or a successor of Generative Pre-trained Transformer 3 (GPT3).

* * * * *